(12) United States Patent
Hu et al.

(10) Patent No.: US 9,501,407 B1
(45) Date of Patent: Nov. 22, 2016

(54) FIRST-IN-FIRST-OUT MEMORY WITH DUAL MEMORY BANKS

(75) Inventors: Ray Ruey-Hsien Hu, Milpitas, CA (US); Andy L. Lee, San Jose, CA (US); David Lewis, Toronto (CA); Tony Ngai, Saratoga, CA (US); Haiming Yu, Pleasanton, CA (US); Hao-Yuan Howard Chou, San Jose, CA (US)

(73) Assignee: Altera Corporation, San Jose, CA (US)

( * ) Notice: Subject to any disclaimer, the term of this patent is extended or adjusted under 35 U.S.C. 154(b) by 1076 days.

(21) Appl. No.: 13/235,228

(22) Filed: Sep. 16, 2011

(51) Int. Cl.
*G06F 12/06* (2006.01)
*G06F 13/16* (2006.01)

(52) U.S. Cl.
CPC ....... *G06F 12/0607* (2013.01); *G06F 13/1689* (2013.01)

(58) Field of Classification Search
CPC ........... G06F 12/0607; G06F 13/1647; G06F 13/1657; G06F 13/1689; G11C 7/1042
USPC ........... 365/230.03, 230.04, 189.05, 189.011
See application file for complete search history.

(56) References Cited

U.S. PATENT DOCUMENTS

| | | | |
|---|---|---|---|
| 4,206,440 A * | 6/1980 | Doi et al. ................... 714/758 |
| 4,433,394 A * | 2/1984 | Torii et al. ............... 365/189.05 |
| 4,672,646 A | 6/1987 | Van Maren |
| 5,349,683 A * | 9/1994 | Wu .......................... G06F 5/065 714/801 |
| 5,371,877 A * | 12/1994 | Drako et al. ....................... 711/5 |
| 5,586,200 A * | 12/1996 | Devaney et al. ............. 382/232 |
| 6,434,642 B1 * | 8/2002 | Camilleri et al. ............ 711/109 |
| 6,667,988 B1 | 12/2003 | Liu et al. |
| 6,920,526 B1 | 7/2005 | Sikkink et al. |
| 7,149,139 B1 | 12/2006 | Rosen |
| 7,698,498 B2 | 4/2010 | Lakshmanamurthy et al. |
| 8,285,944 B1 * | 10/2012 | Nelson, IV .................... 711/167 |
| 2001/0029558 A1 * | 10/2001 | Kobara ................... G06F 5/065 710/57 |
| 2004/0039874 A1 * | 2/2004 | Johnson ....................... 711/105 |
| 2011/0228795 A1 * | 9/2011 | Agrawal et al. .............. 370/417 |

\* cited by examiner

*Primary Examiner* — Michael Krofcheck
(74) *Attorney, Agent, or Firm* — Treyz Law Group, P.C.; G. Victor Treyz; Andrew C. Milhollin

(57) ABSTRACT

A first-in-first-out memory may have first and second memory banks. A write controller may write data into the first and second memory banks. In performing write operations, the write controller may determine whether to write the data into the first bank or the second bank by evaluating a first bank empty flag and a second bank empty flag. When transitioning between writing in the first bank and the second bank, the write controller may latch a write address value indicative of the last location at which valid data was written in a given bank. A read controller may read data from the first and second memory bank. The read controller may determine when to transition between reading in the first bank and reading in the second bank by comparing a current read address to the latched write address value.

19 Claims, 5 Drawing Sheets

| Left | | Right | |
|---|---|---|---|
| Action | Status | Action | Status |
|  | Empty |  | Empty |
| Write A0 | Latch Address 0 |  | Empty |
|  |  | Write A1 |  |
|  | 100 | Write A2 |  |
|  |  | Write A3 |  |
| Read A0 | Empty | Latch Address 3 |  |
| Write A4 |  |  |  |
|  | 102 | Read A1 |  |
| Write A5 |  |  |  |
| Write A6 |  |  |  |
|  |  | Read A2 |  |
| Write A7 |  |  |  |
| Latch Address 7 |  | Read A3 | Empty |
|  |  | Write A8 |  |
| Read A4 |  |  |  |
|  |  | Write A9 |  |
| Read A5 |  |  |  |
|  |  | Write A10 |  |
|  |  | Write A11 |  |
| Read A6 |  |  |  |
|  |  | Write A12 |  |
| Read A7 | Empty | Latch Address 12 |  |
| Write A13 |  |  |  |
|  |  | Read A8 |  |
| Write A14 |  |  |  |

FIG. 2

FIRST-IN-FIRST-OUT MEMORY WITH DUAL MEMORY BANKS

BACKGROUND

It is often necessary to form first-in-first-out (FIFO) memory circuits on integrated circuits. For example, a FIFO circuit may be used in forming an interface between circuits operating in different clock domains.

FIFO circuits are sometimes implemented using arrays of eight-transistor dual-port static random-access memory. This type of dual-port memory may exhibit lower yields and may require higher minimum power supply values than other types of memory.

SUMMARY

Memory circuits such as first-in-first-out memory circuits can be formed from left and right banks of memory. A write controller and a read controller may be used in accessing the banks of memory. The write controller and read controller may provide control signals to coordinate write and read operations between the left and right banks of memory.

During operation of a first-in-first-out memory circuit, write operations can be executed on the bank other than the bank on which the next read operation will be executed. Bank empty flag information may be used to inform the write controller of which bank is empty and available for writing data. Upon transitioning between banks, the write controller may latch the last write address at which valid data was written. The read controller may compare the current read address to the latched write address to determine whether to transition between banks during read operations.

Further features of the invention, its nature and various advantages will be more apparent from the accompanying drawings and the following detailed description of the preferred embodiments.

BRIEF DESCRIPTION OF THE DRAWINGS

FIG. 2 is a diagram showing how data may be written and read using left and right memory banks within a memory array in the first-in-first-out memory of FIG. 1 in accordance with an embodiment of the present invention.

DETAILED DESCRIPTION

Figure 1:
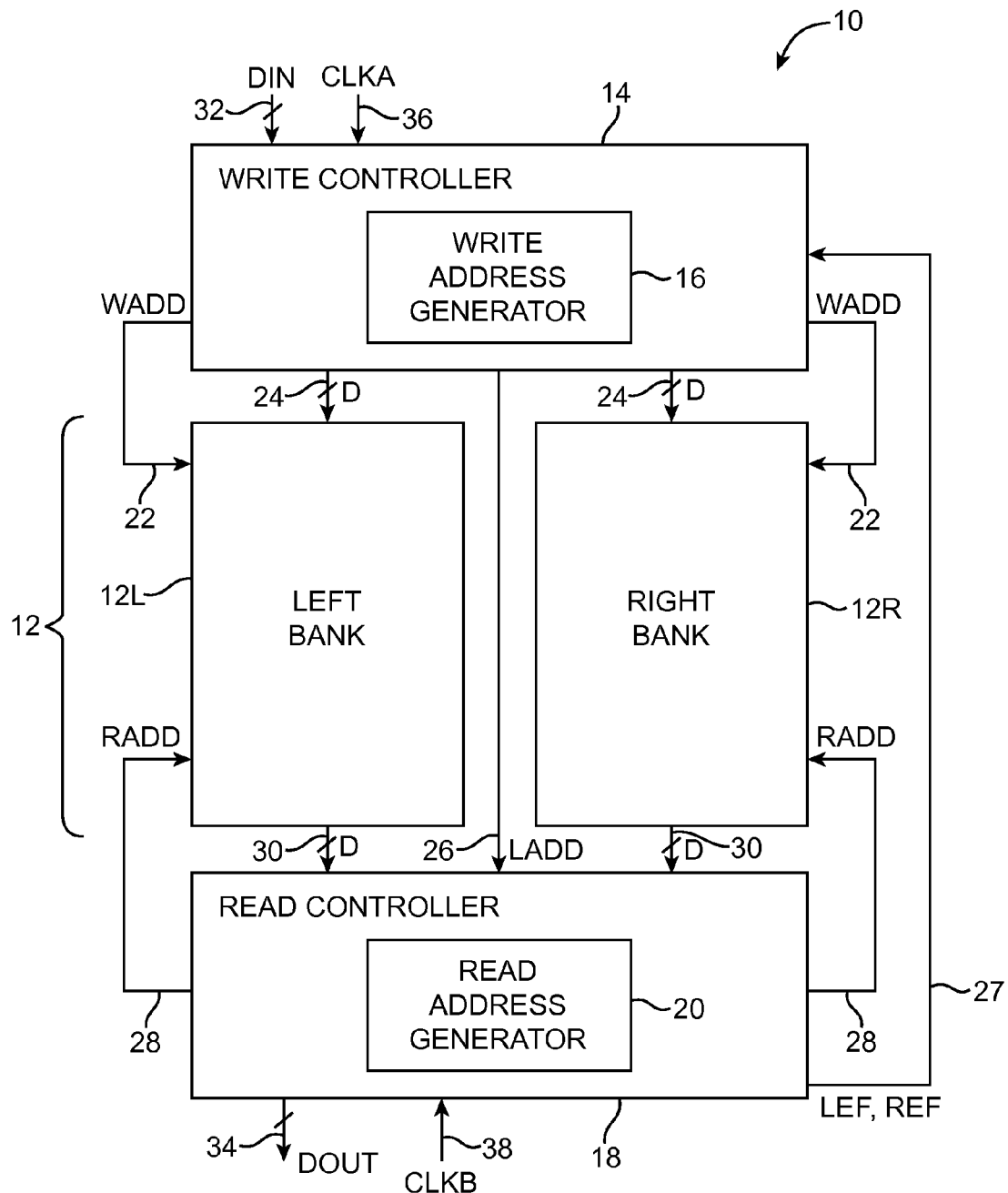
FIG. 1 is a circuit diagram of an illustrative first-in-first-out memory in accordance with an embodiment of the present invention.

An illustrative first-in-first-out (FIFO) memory circuit of the type that may be provided on an integrated circuit is shown in FIG. 1. As shown in FIG. 1, first-in-first-out memory circuit 10 may be formed from an array of memory such as memory 12. Memory 12 may have first and second sub-arrays such as left memory array bank 12L and right memory array bank 12R. Left bank 12L and right bank 12R may have any suitable number of rows and columns of memory cells. For example, if it is desired to handle data in 32-bit words, the width (number of columns) of left bank 12L may be 32 and the width of right bank 12R may be 32. The depth (number or rows) of memory array 12 may be, for example, 32, 64, 128, or other suitable value. The memory cells that form array 12 may have any suitable number of transistors. As an example, the memory cells in array 12 may be six-transistor memory cells each of which has a pair of cross-coupled inverters forming a bistable data storage element and a pair of differential address transistors.

Memory array controller circuitry such as circuitry 14 and 18 may be used in controlling the writing and reading of data using array 12. Data loading operations for array 12 may be handled using write controller 14. Read controller 18 may be used to handle data reading operations for array 12. During operation of FIFO circuit 10, input data to FIFO circuit 10 may be provided to data input port DIN (path 32) of write controller 14. Output data from FIFO circuit 10 may be provided to data output port DOUT (path 34) by read controller 18.

Write addresses for write controller 14 can be generated using write address generator 16. Read addresses may be generated for read controller 18 using read address generator 20. Address generators 16 and 20 may be, for example, Gray code address generators.

Memory array 12 may have associated data lines D. Data line portions 24 of lines D may be used to convey data from write controller 14 to array 12. Write addresses WADD may be provided to array 12 by write controller 14 via paths 22 to control the location at which data on data lines 24 is written into array 12.

Data line portions 30 may be used by read controller 18 in reading data from array 12. Read controller 18 may supply read addresses RADD to memory array 12 via read address paths 28 to control the location from which data is read from array 12.

To coordinate the operations of write controller 14 and read controller 18, write controller 14 and read controller 18 may exchange information during operation of FIFO circuit 10.

Write controller 14 may, for example, provide stored address information (sometimes referred to as "latched" address LADD) to read controller 18 via path 26. The value of LADD may indicate to read controller 18 which row of memory array 12 is the last row that has been loaded with valid data by write controller 14 (i.e., the last write address used by write controller 14). Read controller 18 can use this information in determining when to transition between reading data from one bank and the other.

Read controller 18 can provide information to write controller 14 such as left empty flag LEF and right empty flag REF on path 27. Read controller 18 can assert signal LEF (i.e., read controller 18 can take LEF to a logic high value such as a logic "1") when left bank 12L is available to be loaded with data by write controller 14 (i.e., when the left bank is considered to be "empty"). Write controller 14 can clear signal LEF by taking LEF to a logic low value such as a logic "0" when left bank 12L is unavailable. Similarly, read controller 18 can assert signal REF (i.e., read controller 18 can take REF to a logic high value such as a logic "1") when right bank 12R is available to be loaded with data by write controller 14 (i.e., when the right bank is considered to be "empty"). Write controller 14 can clear signal REF when right bank 12R is unavailable.

Using signals such as latched address LADD and empty flags LEF and REF, first-in-first-out memory 10 may coordinate write and read operations across both the left and right banks of memory array 12. A table showing an illustrative series of write and read operations for memory array 12 during operation of first-in-first-out memory 10 is shown in FIG. 2. As shown in FIG. 2, operations may commence by writing data into left bank 12L using write address WADD A0. Writing may then switch to right bank 12R, starting with a write address WADD of A1 (and, in this example including successive write operations at address A2 and A3), as indicated by line 100. Because the last valid data written to left bank 12L (in this example) was at address A0, write controller 14 may store ("latch") the value of A0 before transitioning from the left bank to the right bank and writing data into right bank 12R. The latched address value can be used by read controller 18 to determine the last location (address A0) from which to read data from left bank 12L before transitioning to reading from right bank 12R.

Once data is being written into the right bank, subsequent transitions between right bank write operations and left bank write operations may be governed by the values of flags LEF and REF. If, for example, LEF is asserted by read controller 18 while write controller 14 is writing to right bank 12R, write controller 14 can conclude that left bank 12L has become available for writing and can switch back to writing into left bank 12L, as indicated by line 102. In doing so, write controller 14 can again latch the last write data address (A3 in this example) that has been used to write valid data. Read controller 18 can use the value of LADD (A3) to determine when to stop reading from right bank 12R and switch back to reading from left bank 12L. As shown in FIG. 2, read controller 18 can (as an example) read data from right bank 12R using addresses A1, A2, and A3. Once the data associated with address A3 has been read from right bank 12R (i.e., once the current read address value of A3 is equal to the latched write address A3, read controller 18 can assert flag REF to indicate to write controller 14 that the right bank is now available for writing without interference from read operations (i.e., the right bank is "empty") and can switch back to reading from left bank 12L.

By sharing left bank 12L and right bank 12R in this way, write controller 14 and read controller 18 can be used to implement first-in-first-out memory 10 using memory cells based on six transistors. For example, each memory cell in memory array 12 may include four transistors used to form cross-coupled inverters that serve as a bistable data storage element and a pair of differential address transistors. The pair of address transistors may be coupled between data lines (e.g., respective data lines in a pair of complementary data lines) and respective true and complement nodes in the bistable data storage element. The address transistors may be controlled by an address line and may be used to read and write data from the bistable data storage element. Memory cells with other numbers of transistors may be used if desired.

Figure 3:
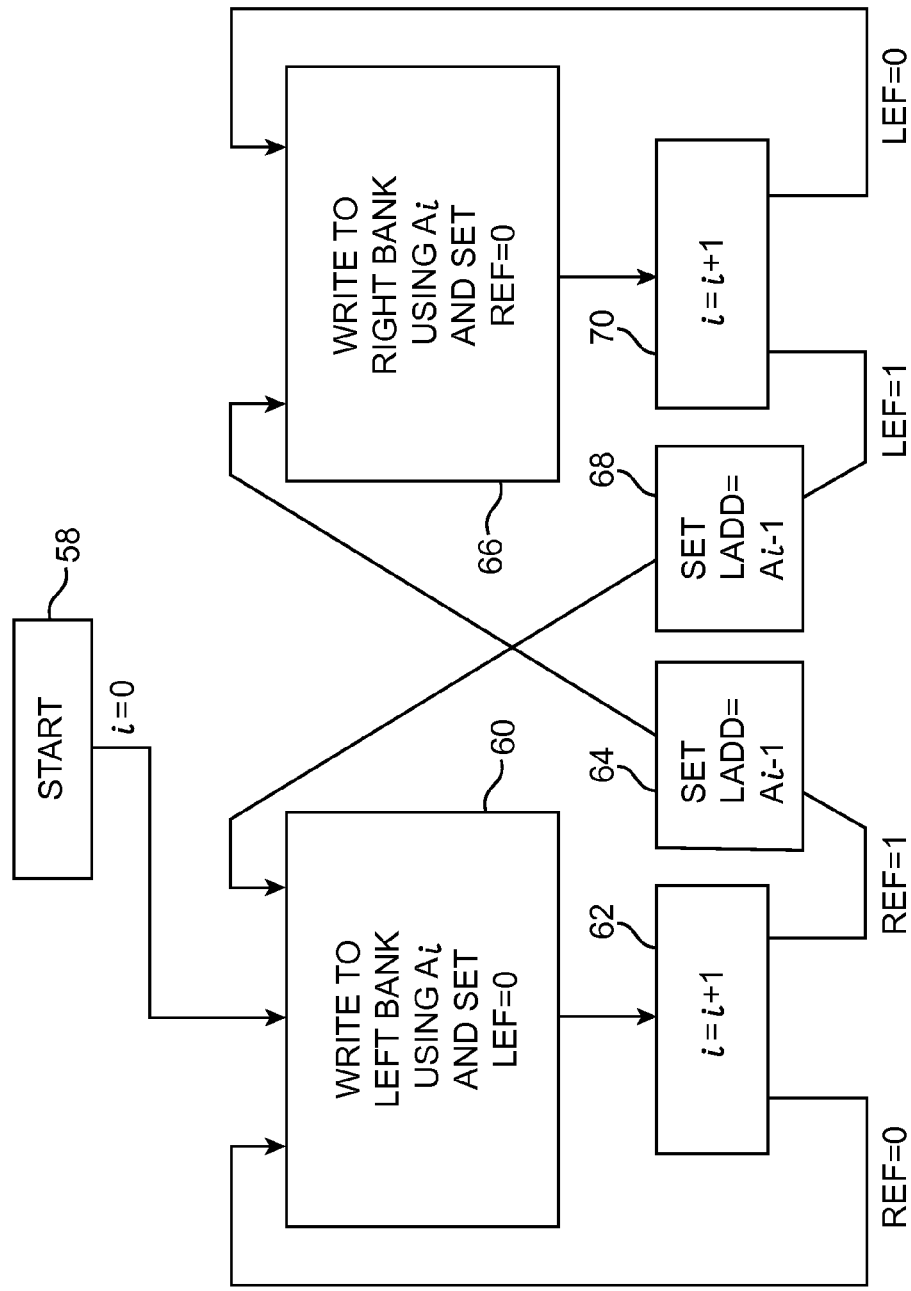
FIG. 3 is a flow chart of illustrative operations involved in using a write controller of the type shown in FIG. 1 to perform write operations in a first-in-first-out memory of the type shown in FIG. 1.
Figure 4:
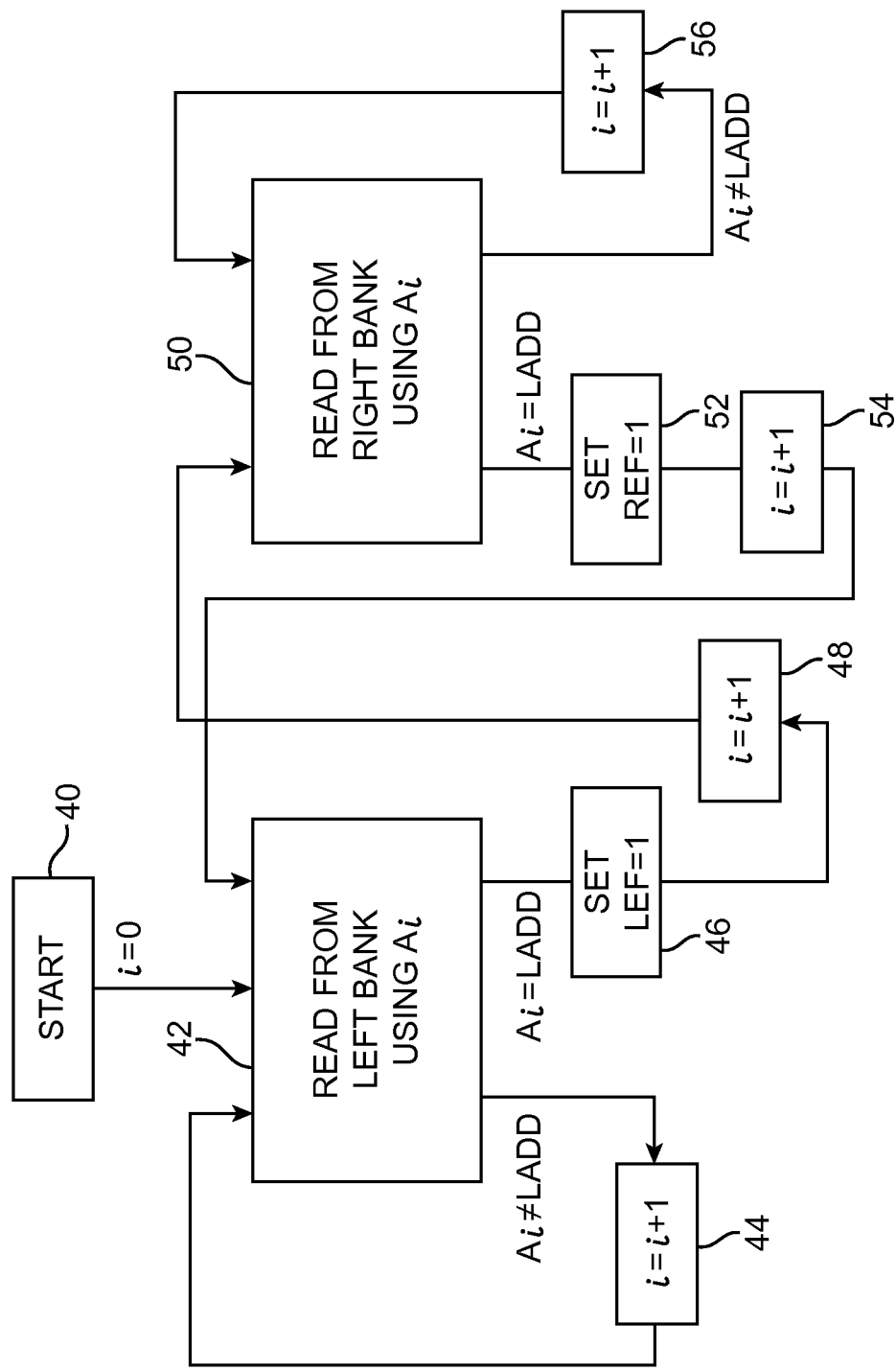
FIG. 4 is a flow chart of illustrative operations involved in using a read controller of the type shown in FIG. 1 to perform read operations in a first-in-first-out memory of the type shown in FIG. 1.

FIGS. 3 and 4 illustrate operations performed by write controller 14 and read controller 18, respectively. In FIGS. 3 and 4, the index value i serves as an address index for address parameter Ai (i.e., when i is equal to 2, the read/write address Ai has the value of A2, when i is equal to 3, Ai has the value of A3, etc.).

As shown in FIG. 3, write controller 14 may initiate write operations (start 58) with an address index value i of 0. At step 60, write controller 14 may write data to left bank 12L using address Ai (which is initially A0 as shown in the table of FIG. 2). At step 62, the value of index i may be incremented by one (i.e., index i may be set to 1 when the current index i is 0).

The operation of write controller 14 following the incrementing of the address index depends on the value of right bank empty flag REF. The value of REF may be controlled by read controller 18 and may be provided to write controller 14 via path 27 (FIG. 1). When all data has been read from bank 12R by read controller 18, the right bank may be considered to be "empty" (ready for writing) and read controller 18 may assert flag REF (i.e., read controller 18 may set the value of REF to "1"). Write controller 14 can clear flag REF after data has been loaded into the right bank.

In response to detecting a REF value of 0, processing may loop back to step 60 for additional writing in the left bank. In response to detecting a REF value of 1, write controller 14 may set the value of latched address LADD to Ai−1 at step 64. Write controller 14 may then transition to writing in the right bank and may, at step 66, write data to right bank 12R using address Ai. During the operations of step 66, the right empty flag REF may be reset to 0 by the memory array control circuitry (i.e., by write controller 14).

During the operations of step 66, write controller 14 may write data to right bank 12R using address Ai (see, e.g., the table of FIG. 2). At step 70, the value of index i may be incremented by one.

The operation of write controller 14 following the incrementing of the address index at step 70 depends on the value of left bank empty flag LEF. The value of LEF may be controlled by read controller 18 and may be provided to write controller 14 via path 27 (FIG. 1). When all data has been read from bank 12L by read controller 18, the left bank may be considered to be "empty" (ready for writing) and read controller 18 may assert flag LEF (i.e., read controller 18 may set the value of LEF to "1"). Write controller 14 can clear flag LEF after data has been loaded into the left bank.

In response to detecting a LEF value 0, processing may loop back to step 66 for additional writing in the right bank. In response to detecting a LEF value of 1, write controller 14 may set the value of latched address LADD to Ai−1 at step 68. Write controller 14 may then transition to writing in the left bank (step 60).

Processing may continue in this way indefinitely (i.e., the sum operations of steps 62 and 70 may be performed modulo K, where K is the depth of memory array 12).

FIG. 4 shows illustrative steps involved in operating read controller 18. As shown in FIG. 4, write controller 14 may initiate read operations (start 40) with an address index value i of 0. At step 42, read controller 18 may read data from left bank 12L using address Ai (which is initially A0 as shown in the table of FIG. 2). The behavior of read controller 18 following the read operations of step 42 depends on the relative values of Ai and LADD. The value of LADD is set by write controller 14 and represents the last address for a given memory bank where valid data was written. During the operations of step 42, read controller 18 may compare the current value of Ai to the value of LADD. If Ai is not equal to LADD, more valid data entries remain in left bank 12L to be read by read controller 18. Accordingly, index i can be incremented by one at step 44 and processing can loop back to step 42. In response to detection that Ai is equal to LADD, read controller 18 can conclude that the last valid data entry in left bank 12L has just been read out, so that read operations should transition to the right bank. Accordingly, read controller 18 may assert left empty flag LEF at step 46 to indicate that all entries have been read from left bank 12L so that left bank 12L is available for data writing. The index i may then be incremented at step 48 and processing can continue at step 50, where read controller 18 may read data from right bank 12R using address Ai.

During the operations of step 50, read controller 18 may compare the current value of Ai to the current value of LADD. If Ai is not equal to LADD, more valid data entries remain in right bank 12R to be read by read controller 18. Accordingly, index i can be incremented by one at step 56 and processing can loop back to step 50. In response to detection that Ai is equal to LADD at step 50, read controller 18 can conclude that the last valid data entry in right bank 12L has just been read out, so that read operations should transition to the left bank. Read controller 18 may therefore assert right empty flag REF at step 52 to indicate that all entries have been read from right bank 12R so that right bank 12R is available for data writing. The index i may then be incremented at step 54 and processing can continue at step 42.

Data reading operations may continue in this way indefinitely. The sum operations of steps 44 and 48 may be performed modulo K, where K is the depth of memory array 12.

Figure 5:
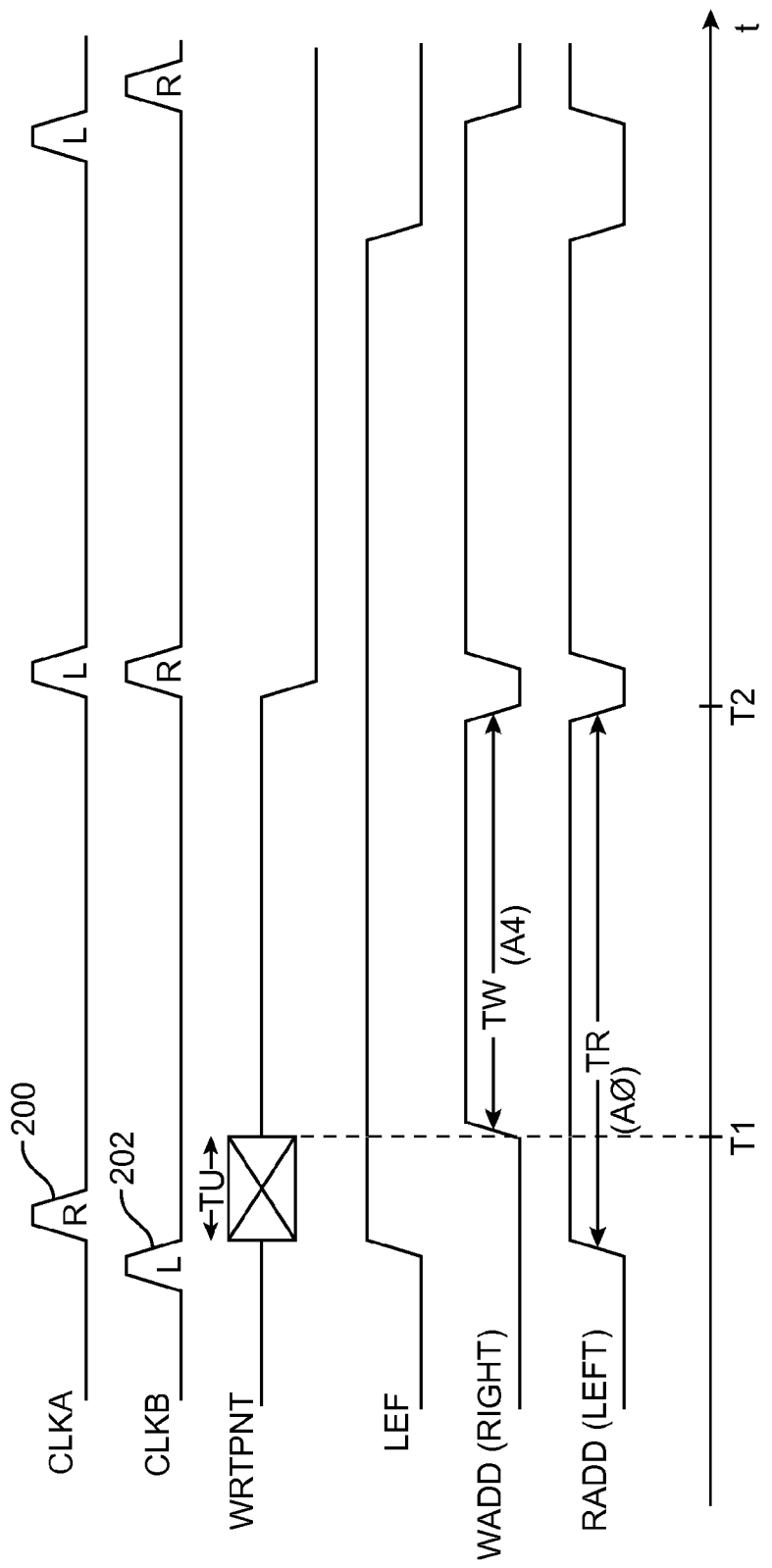
FIG. 5 is a timing diagram of illustrative signals involved in controlling the operation of a first-in-first-out memory of the type shown in FIG. 1 in accordance with an embodiment of the present invention.

Timing considerations associated with the operation of first-in-first-out memory circuit 10 of FIG. 1 are illustrated in the graph of FIG. 5.

As shown in FIG. 5, the clock for the write controller (CLKA) may differ from the clock for the read controller (CLKB) (i.e., clocks CLKA and CLKB may be asynchronous, as illustrated in the first and second traces of FIG. 5). Due to processing delays within write controller 14, a time delay of TU is generally associated with processing flags REF and LEF to make a decision as to whether to write data into the right or left bank of array 12. An internal write pointer signal in the write controller such as signal WRTPNT in the third trace of FIG. 5 may be taken high when write controller 14 had decided to write data into the right bank and may be taken low when write controller 14 is to write data into the left bank. As shown in the FIG. 5 example, during time period TU following assertion of the bank empty flag (i.e., flag LEF in this example), the signal WRTPNT is not yet valid.

The memory controller circuitry may be configured so that the duration TW of the write address signals WADD is more than TU shorter than the duration TR of the read address signals RADD as shown in the fifth and sixth traces of FIG. 5. The graph of FIG. 5 corresponds to a write operation for address A4 and a read operation for A0 (see, e.g., FIG. 2) and illustrates a worst-case scenario. If the clock pulse associated with CLKA were slower (i.e., not a worst-case scenario), the write operation associated with WADD (i.e., the writing of data at address A4) would take place on the left bank as expected. However, in the FIG. 5 worst-case scenario, CLKA goes high soon after CLKB, as shown by pulses 200 and 202, respectively. Left bank empty flag LEF is asserted by read controller 18 on the rising edge of clock CLKB. Due to processing delay TU in write controller 14, write pointer signal WRTPNT (the internal signal that determines whether write controller 14 asserts WADD on the right or left bank) is not valid until time T1. As a result, the write operation at time T1 is made to the "wrong" bank (i.e., the right bank). Nevertheless, this is acceptable because the right bank is not being used for reading at time T1 and because the right bank will remain unoccupied until time T2 (due to the relative lengths of write address signal WADD, which has duration TW, and read address signal RADD, which has a duration TR that is at least TU larger than TW).

The foregoing is merely illustrative of the principles of this invention and various modifications can be made by those skilled in the art without departing from the scope and spirit of the invention.

What is claimed is:

1. Circuitry, comprising:
   a first memory bank;
   a second memory bank;
   a write controller configured to write data into the first and second memory banks from a data input; and
   a read controller configured to read the data from the first and second memory banks and provide the read data to a data output, wherein the read controller is configured to assert at least one bank empty flag that indicates when all data has been read from a selected one of the first and second memory banks, wherein the read controller is configured to generate read address pulses of a read address pulse duration and wherein the write controller is configured to generate write address pulses of a write address pulse duration that is shorter than the read address pulse duration.

2. The circuitry defined in claim 1 wherein the write controller is configured to write the data into the first and second memory banks using a write address and wherein the write controller is configured to provide the read controller with a latched value of the write address when transitioning between writing in the first memory bank and writing in the second memory bank.

3. The circuitry defined in claim 1 wherein the write controller is characterized by a processing delay when evaluating the bank empty flag and wherein write controller and read controller are configured so that the read address pulse duration minus the write address pulse duration is more than the processing delay.

4. The circuitry defined in claim 1 wherein the write controller is configured to apply a write address signal to a selected one of the first and second memory banks when writing the data so that the data is written into only the selected one of the first and second memory banks from the data input during a given write operation.

5. The circuitry defined in claim 4 wherein the write controller comprises a Gray code write address generator.

6. The circuitry defined in claim 1 wherein the read controller is configured to apply a read address to a selected one of the first and second memory banks when reading the data so that the data is read from only the selected one of the first and second memory banks during a given read operation.

7. The circuitry defined in claim 6 wherein the read controller comprises a Gray code read address generator.

8. A method for operating a first-in-first-out memory circuit that has a first memory bank and a second memory bank, comprising:
   with a write controller, writing data to a first selected one of the first and second memory banks from a data input of the first-in-first-out memory circuit;
   with the write controller, evaluating first and second bank empty flags that are indicative of whether at least one of the first and second memory banks is ready for receiving data from the write controller;
   with the write controller, storing a write address value in response to determining that at least one of the first and second bank empty flags has been asserted; and with a read controller, asserting a selected one of the first and second bank empty flags in response to determining that a current read address being used by the read controller to read data from a second selected one of the first and second memory banks is equal to the stored write address value.

9. The method defined in claim 8 further comprising:
with the read controller, reading data from a given one of the first and second memory banks; and
with the read controller, comparing the current read address to the stored write address value.

10. The method defined in claim 9 further comprising:
in response to determining that the current read address is not equal to the stored write address value, reading data from the given one of the first and second memory banks.

11. The method defined in claim 10 further comprising:
in response to determining that the current read address is equal to the stored write address value, transitioning from the given one of the memory banks to an alternate one of the memory banks when reading data using the read controller.

12. The method defined in claim 11 wherein the given one of the memory banks comprises the first memory bank and wherein transitioning from the given one of the memory banks to the alternate one of the memory banks comprises reading from the second memory bank instead of the first memory bank in response to determining that the current read address is equal to the stored write address.

13. The method defined in claim 9 further comprising:
in response to determining that the current read address is equal to the stored write address value, transitioning from the given one of the memory banks to an alternate one of the memory banks when reading data using the read controller.

14. The method defined in claim 8 further comprising:
determining whether a read controller should read data from the first memory bank or from the second memory bank based at least partly on the stored write address value.

15. A method for operating a first-in-first-out memory circuit that has a first memory bank and a second memory bank and that has a data input and a data output, comprising:
with a write controller coupled to the first and second memory banks, selecting a first given memory bank from the first and second memory banks into which data is to be written from the data input based on a first bank empty flag that is asserted by a read controller when the first memory bank is available for data writing and based on a second bank empty flag that is asserted by the read controller when the second memory bank is available for data writing;
with the read controller, asserting the first bank empty flag in response to determining that a current read address being used by the read controller to read the data from the first given memory bank is equal to a write address value; and
with the write controller, storing the write address value in response to determining that the second bank empty flag has been asserted.

16. The method defined in claim 15 further comprising:
with the read controller coupled to the first and second memory banks, selecting a second given memory bank from the first and second memory banks from which to read data for the data output.

17. A method for operating a first-in-first-out memory circuit that has a first memory bank and a second memory bank and that has a data input and a data output, comprising:
with a read controller, asserting a selected one of first and second bank empty flags in response to determining that a current read address being used by the read controller to read the data from a first given memory bank is equal to a write address value;
selecting the first given memory bank from the first and second memory banks into which data is to be written from the data input in response to the read controller asserting the selected one of the first and second bank empty flags; and
with a write controller, storing a new write address in response to determining that the selected one of the first and second bank empty flags has been asserted.

18. The method defined in claim 17 wherein selecting the first given memory bank comprises:
with the write controller, selecting the first given memory bank based on the selected one of the first and second bank empty flags.

19. The method defined in claim 18 further comprising:
selecting a second given memory bank from the first and second memory banks from which to read data for the data output.

* * * * *